(12) United States Patent
Yanagimoto

(10) Patent No.: US 12,116,129 B2
(45) Date of Patent: *Oct. 15, 2024

(54) FLYING BODY

(71) Applicant: SOFTBANK CORP., Tokyo (JP)

(72) Inventor: Noritomo Yanagimoto, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,960

(22) Filed: Jun. 9, 2023

(65) Prior Publication Data

US 2023/0322383 A1    Oct. 12, 2023

Related U.S. Application Data

(63) Continuation of application No. PCT/JP2021/040671, filed on Nov. 4, 2021.

(30) Foreign Application Priority Data

Dec. 14, 2020    (JP) .................................. 2020-207089

(51) Int. Cl.
*B64C 39/10*    (2006.01)
*B64C 3/48*    (2006.01)
(Continued)

(52) U.S. Cl.
CPC ................ *B64C 39/10* (2013.01); *B64C 3/48* (2013.01); *B64C 11/46* (2013.01); *B64C 99/00* (2022.08);
(Continued)

(58) Field of Classification Search
CPC ........... B64C 39/10; B64C 99/00; B64C 3/48; B64D 27/24; B64D 33/10; B64D 27/31
See application file for complete search history.

(56) References Cited

U.S. PATENT DOCUMENTS

| 5,810,284 A * | 9/1998 | Hibbs | .................... B64D 27/24 244/45 R |
| 2004/0194975 A1* | 10/2004 | Trumper | ................. B64D 41/00 169/35 |

(Continued)

FOREIGN PATENT DOCUMENTS

| CN | 106828947 A | 6/2017 |
| CN | 211017160 U | 7/2020 |

(Continued)

OTHER PUBLICATIONS

Decision to Grant a Patent issued for counterpart Japanese Application No. 2020-207089, issued by the Japanese Patent Office on Jan. 4, 2023 (drafted on Dec. 19, 2022).
(Continued)

*Primary Examiner* — Rodney A Bonnette

(57) ABSTRACT

There is provided a flight vehicle including: a wing unit; a battery that is arranged in the wing unit; an air intake unit that is formed at a position corresponding to the battery on a front side of the wing unit; a heat sink unit that is arranged for the battery and cools the battery by air which flows in from the air intake unit and that includes a ventilation unit having a shape widening from the front side toward a rear side; and an exhaust unit that is formed at a position corresponding to the battery on the rear side of the wing unit and that exhausts air which flows out from the heat sink unit.

20 Claims, 9 Drawing Sheets

(51) Int. Cl.
  *B64C 11/46* (2006.01)
  *B64C 99/00* (2023.01)
  *B64D 27/24* (2006.01)
  *B64D 27/31* (2024.01)
  *B64D 27/357* (2024.01)
  *B64D 33/10* (2006.01)

(52) U.S. Cl.
  CPC ............ *B64D 27/24* (2013.01); *B64D 27/31* (2024.01); *B64D 27/357* (2024.01); *B64D 33/10* (2013.01)

(56) References Cited

U.S. PATENT DOCUMENTS

| | | |
|---|---|---|
| 2005/0269441 A1* | 12/2005 | Barocela .................. B64B 1/24 244/25 |
| 2007/0095521 A1 | 5/2007 | Muhlthaler |
| 2015/0232191 A1 | 8/2015 | Wetzel |
| 2022/0022119 A1 | 1/2022 | Sai |
| 2023/0307738 A1* | 9/2023 | Yanagimoto ........ H01M 10/625 |

FOREIGN PATENT DOCUMENTS

| | | |
|---|---|---|
| EP | 1600370 A2 | 11/2005 |
| EP | 3643889 A1 | 4/2020 |
| JP | 2005082018 A | 3/2005 |
| JP | 2020170888 A | 10/2020 |
| JP | 2020183210 A | 11/2020 |
| WO | 9628343 A1 | 9/1996 |
| WO | 2020174213 A1 | 9/2020 |

OTHER PUBLICATIONS

Extended European search Report for counterpart European Application No. 21906182.7, issued by the European Patent Office on Apr. 17, 2024.

Extended EuropeanSearch Report for related European Application No. 21906183.5, issued by the European Patent Office on Apr. 18, 2024.

* cited by examiner

FLYING BODY

The contents of the following patent application(s) are incorporated herein by reference:
NO. 2020-207089 filed in JP on Dec. 14, 2020
NO. PCT/JP2021/040671 filed in WO on Nov. 4, 2021

BACKGROUND

1. Technical Field

The present invention relates to a flight vehicle.

2. Related Art

Patent Document 1 discloses a flight vehicle that stores power generated by a solar panel in a battery and flies by using power of the battery or provides a wireless communication service.

PRIOR ART DOCUMENT

Patent Document

Patent Document 1: Japanese Patent Application Publication No. 2020-170888

DESCRIPTION OF EXEMPLARY EMBODIMENTS

Hereinafter, the present invention will be described through embodiments of the invention, but the following embodiments do not limit the invention according to claims. In addition, not all combinations of features described in the embodiment are essential to the solution of the invention.

Figure 1:
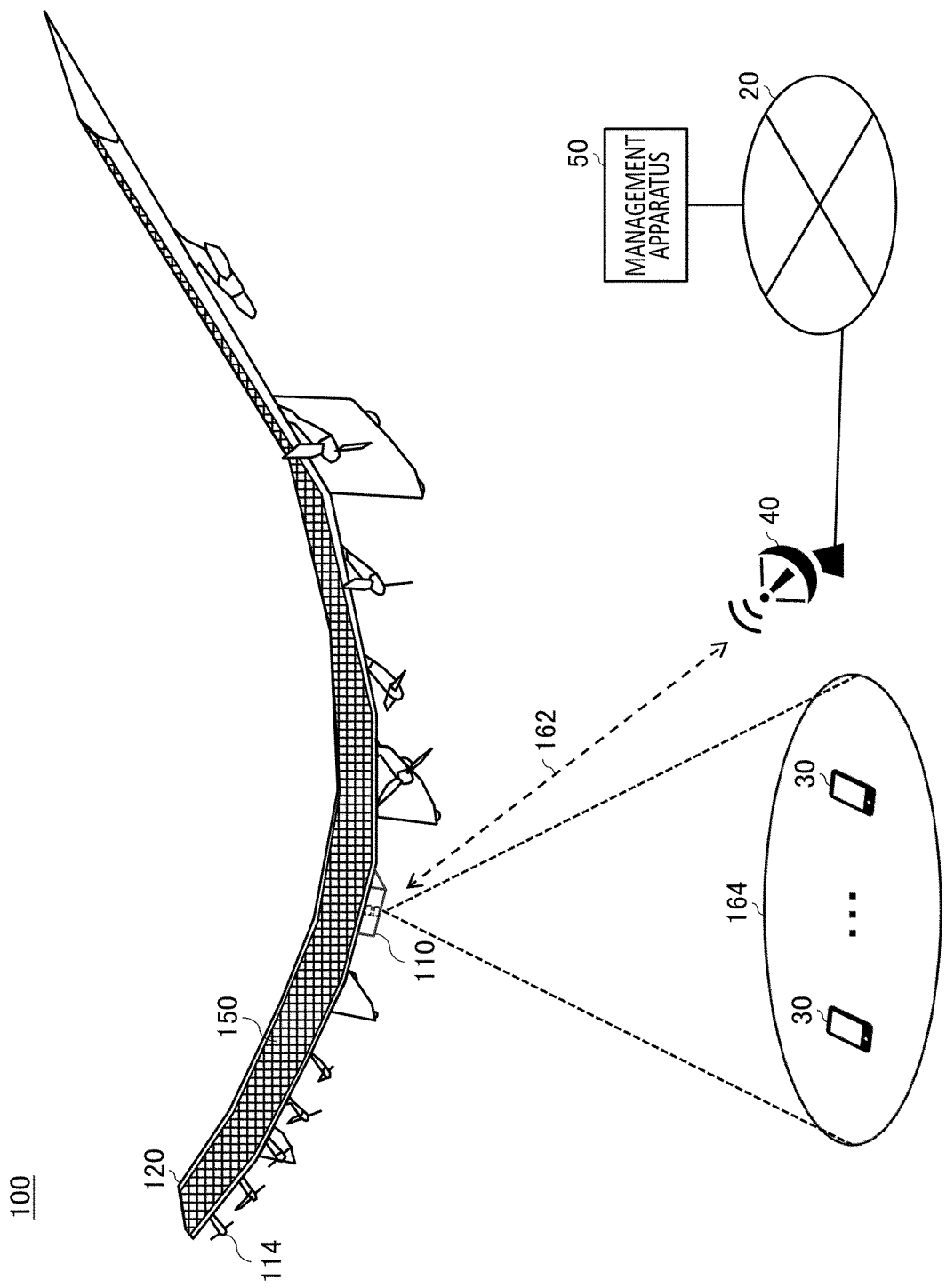
FIG. 1 schematically shows an example of a HAPS 100.

FIG. 1 schematically shows an example of a HAPS (High Altitude Platform Station) 100. The HAPS 100 may be an example of a flight vehicle. The HAPS 100 may function as a stratospheric platform. While flying in a stratosphere, the HAPS 100 forms a feeder link 162 with a gateway 40 on the ground, and forms a wireless communication area 164 on the ground.

The HAPS 100 includes a main body unit 110, a propeller 114, a wing unit 120, and a solar panel 150. Power generated by the solar panel 150 is stored in a battery arranged in the wing unit 120. The power stored in the battery is used by each configuration in the HAPS 100.

A payload is arranged in the main body unit 110. The payload may include electronic equipment. For example, the payload includes a control apparatus that controls flight and a communication of the HAPS 100. The payload may also include a control motor.

The control apparatus controls the flight of the HAPS 100, for example, by controlling a rotation of the propeller 114, an angle of a flap or an elevator, or the like. The control apparatus may manage various types of sensors included in the HAPS 100. Examples of sensors include a positioning sensor such as a GPS sensor, a gyro sensor, an acceleration sensor, and the like. The control apparatus may manage a location, a posture, a movement direction, and a movement speed of the HAPS 100 by outputs of the various types of sensors.

The control apparatus may use, for example, a FL (Feeder Link) antenna to form the feeder link 162 with the gateway 40. The control apparatus may access a network 20 via the gateway 40. The control apparatus may communicate with a management apparatus 50 connected to the network 20.

The control apparatus may transmit various pieces of information to the management apparatus 50. For example, the control apparatus transmits telemetry information to the management apparatus 50. The telemetry information may include location information of the HAPS 100. The location information may indicate a three-dimensional location of the HAPS 100. The telemetry information may include posture information of the HAPS 100. The posture information may indicate a pitch, a roll, and a yaw of the HAPS 100. The telemetry information may include movement direction information indicating the movement direction of the HAPS 100. The telemetry information may include movement speed information indicating the movement speed of the HAPS 100.

In addition, the control apparatus uses, for example, an SL (Service Link) antenna to form the wireless communication area 164 on the ground. The control apparatus uses the SL antenna to form a service link with a user terminal 30 on the ground.

The user terminal 30 may be any communication terminal as long as the user terminal 30 is able to communicate with the HAPS 100. The user terminal 30 is, for example, a mobile phone such as a smartphone. The user terminal 30 may be a tablet terminal, a PC (Personal Computer), and the like. The user terminal 30 may also be, so-called an IoT (Internet of Thing) device. The user terminal 30 may include anything that corresponds to a so-called IoE (Internet of Everything).

The HAPS 100 relays a communication between the network 20 and the user terminal 30, for example, via the feeder link 162 and the service link. The HAPS 100 may provide the wireless communication service to the user terminal 30 by relaying the communication between the user terminal 30 and the network 20.

The network 20 includes a mobile communication network. The mobile communication network may conform to any of the 3G (3rd Generation) communication system, the LTE (Long Term Evolution) communication system, the 5G (5th Generation) communication system, and the 6G (6th Generation) communication system and the communication system of the subsequent generation. The network 20 may include the Internet.

For example, the HAPS 100 transmits data received from the user terminal 30 in the wireless communication area 164 to the network 20. In addition, for example, when the HAPS 100 receives data addressed to the user terminal 30 in the wireless communication area 164, via the network 20, the HAPS 100 transmits the data to the user terminal 30.

The management apparatus 50 manages the HAPS 100. The management apparatus 50 may communicate with the HAPS 100 via the network 20 and the gateway 40. It should be noted that the management apparatus 50 may communicate with the HAPS 100 via a communication satellite. The management apparatus 50 may control the HAPS 100 by transmitting various types of instructions.

The management apparatus 50 may cause the HAPS 100 to circle over a target area such that the target area on the ground is covered by the wireless communication area 164. For example, the HAPS 100 maintains the feeder link with the gateway 40 by adjusting a pointing direction of the FL antenna while flying in a circular orbit over the target area, and maintains the coverage of the target area by the wireless communication area 164 by adjusting a pointing direction of the SL antenna.

When a flow on an upper surface of a wing of an aircraft is taken in, it is possible to maintain a laminar flow, and an effect of increasing lift and reducing drag may be obtained; however, due to a problem of a weight increase or a complicated structure, in a typical structure of the aircraft, the intake of the flow is only partially adopted in some aircraft. The HAPS 100 according to the present embodiment contributes to solving the problem in the related art by taking in air from a front edge portion of the wing unit 120, heating and expanding the air which is taken in, by exhaust heat of the battery, and accelerating the air to exhaust the air from a rear edge portion of the wing unit 120, thereby preventing peeling and maintaining the laminar flow. As a specific example, in the HAPS 100 according to the present embodiment, as a front edge panel structure obtained by a process of forming innumerable minute openings by laser beam machining, an air intake unit takes in a boundary layer by a negative pressure of a rear portion to slow down the peeling. Then, by a structure of a heat sink that is provided on an upper portion of the battery and that has a shape of a harmonica in which a cross sectional area increases, an introduced atmosphere cools the battery, and the atmosphere which is taken in is caused to be heated, expanded, and accelerated. In a structure of the present invention, for a last part, through an exhaust unit that includes a nozzle for reducing the cross sectional area to increase a flow velocity, the atmosphere accelerated by the heat sink is further accelerated and discharged to prevent the peeling.

Figure 2:
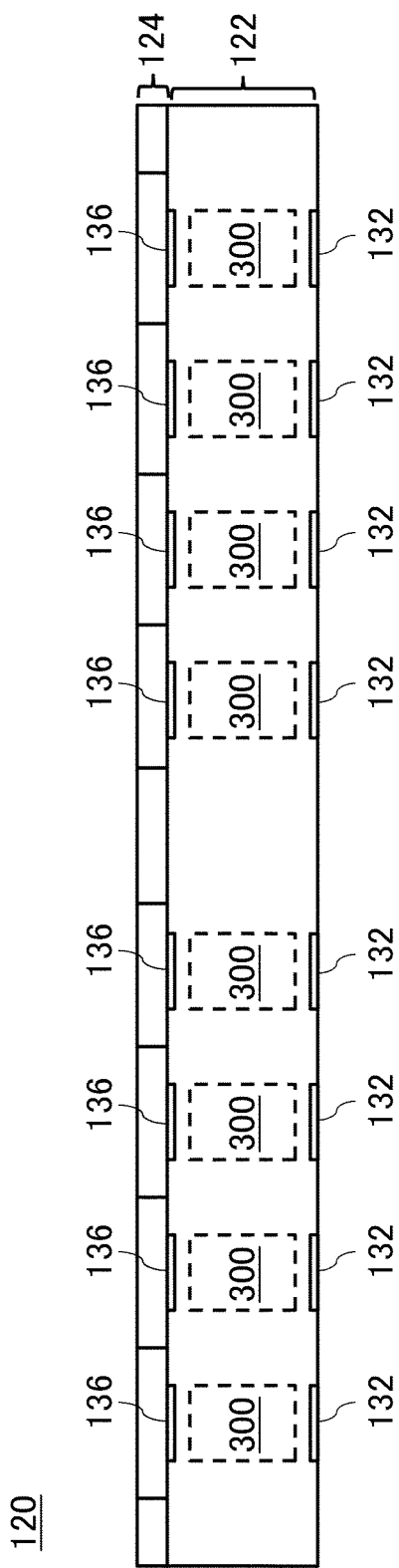
FIG. 2 schematically shows an example of a structure of a wing unit 120 of the HAPS 100.

FIG. 2 schematically shows an example of a structure of a wing unit 120 of the HAPS 100. FIG. 2 illustrates a case where eight batteries 300 are arranged in the wing unit 120; however, the number of batteries 300 is not limited to this, and may be another number. In order to keep a weight balance as a whole, it may be desirable to arrange the same number of batteries 300 on a right wing side and a left wing side to be symmetrical. It should be noted that in the example shown in FIG. 2, the HAPS 100 includes a plurality of batteries 300; however, the HAPS 100 may include only one battery 300.

The wing unit 120 may include an air intake unit 132 formed at a position corresponding to the battery 300 on a front side. The air intake unit 132 is arranged, for example, at the front edge portion of the wing unit 120. The air intake unit 132 has, for example, a plurality of openings. The air intake unit 132 has a large number of minute openings formed, for example, by the laser beam machining.

The wing unit 120 includes an exhaust unit 136 formed at a position corresponding to the battery 300 on a rear side. The exhaust unit 136 is arranged, for example, between a main wing 122 and a movable wing 124 of the wing unit 120.

The wing unit 120 may include a plurality of air intake units 132 and a plurality of exhaust units 136 that respectively correspond to the plurality of batteries 300, as shown in FIG. 2.

Figure 3:
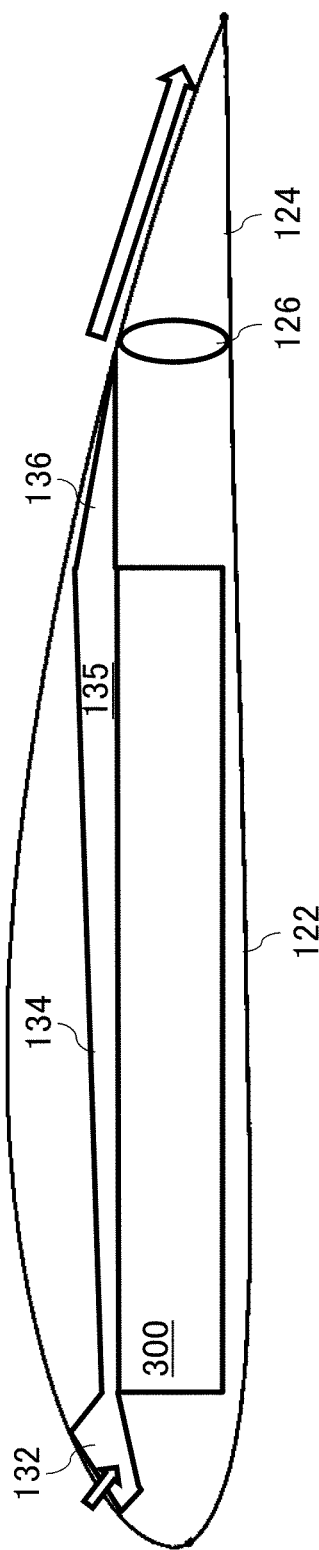
FIG. 3 schematically shows a cross sectional view of the wing unit 120 of the HAPS 100.

FIG. 3 schematically shows a cross sectional view of the wing unit 120 of the HAPS 100. The wing unit 120 includes the main wing 122, and the movable wing 124 connected to the main wing 122 via a hinge 126. The wing unit 120 may include a heat sink unit 134 that is arranged for the battery 300 and that cools the battery 300 by the air which flows in from the air intake unit 132. The heat sink unit 134 may have a shape corresponding to a shape of the battery 300. For example, when an upper surface of the battery 300 has a rectangular shape, a lower surface of the heat sink unit 134 may have a rectangular shape with the same size as that of the upper surface of the battery 300.

A width of the air intake unit 132 may be the same as a width of the heat sink unit 134. The width of the air intake unit 132 may be narrower, or may be wider than the width of the heat sink unit 134.

A width of the exhaust unit 136 may be the same as the width of the heat sink unit 134. The width of the exhaust unit 136 may be narrower, or may be wider than the width of the heat sink unit 134.

The heat sink unit 134 has a ventilation unit 135 having a shape widening from the front side toward the rear side. The ventilation unit 135 may have a shape which increases in height from the front side toward the rear side. This makes it possible to heat, expand, and accelerate the air which is taken in, while cooling the battery 300.

The heat sink unit 134 has, for example, a harmonica shape. The heat sink unit 134 having the harmonica shape makes it possible for the heat of the battery 300 to be efficiently exhausted without a severe obstruction of a flow of the air which flows in from the air intake unit 132 and is exhausted from the exhaust unit 136. It should be noted that the heat sink unit 134 may have a hollow structure rather than the harmonica shape.

The air intake unit 132, the heat sink unit 134, and the exhaust unit 136 are connected. The exhaust unit 136 exhausts the air which flows out from the heat sink unit 134, to an outside of the wing unit 120. The air intake unit 132 takes in a laminar boundary layer on the front side of the wing unit 120 by the negative pressure of the rear portion. By taking in the laminar boundary layer, it is possible to slow down the peeling of the laminar flow, and it is possible to maintain the laminar flow, and increase the lift and reduce the drag.

In this way, by adopting the structure in which the negative pressure of the rear portion is applied to the air intake unit 132, it is possible to take in the laminar boundary layer without using a plasma actuator or the like. When the plasma actuator is used, very high power is necessary and the total weight increases. With the structure of the wing unit 120 according to the present embodiment, it is possible to reduce power consumption in comparison with a case where the plasma actuator is used, and it is possible to contribute to a reduction of the total weight of the HAPS 100.

The exhaust unit 136 may have a shape which narrows from the front side toward the rear side. The exhaust unit 136 has, for example, a shape which decreases in height from the front side toward the rear side. In this way, by the exhaust unit 136 having a structure in which the cross sectional area decreases from the front side toward the rear side, it is possible to increase, for the exhaust, the flow velocity of the air from the heat sink unit 134.

The exhaust unit 136 may realize the exhaust along an upper surface of the movable wing 124 as illustrated in FIG. 3. The exhaust unit 136 has an exhaust port, for example, between the main wing 122 and the hinge 126. The exhaust unit 136 generates propulsion power for the HAPS 100 by the exhaust and attracts the laminar boundary layer on the rear side of the wing unit 120.

The air which flows from the heat sink unit 134 to the exhaust unit 136 is heated, expanded, and accelerated by the heat sink unit 134 as described above, and can be further accelerated by the exhaust unit 136, which makes it possible to contribute to the propulsion power of the HAPS 100, and makes it possible to contribute to preventing the peeling of the laminar boundary layer on the rear side of the wing unit 120.

Figure 4:
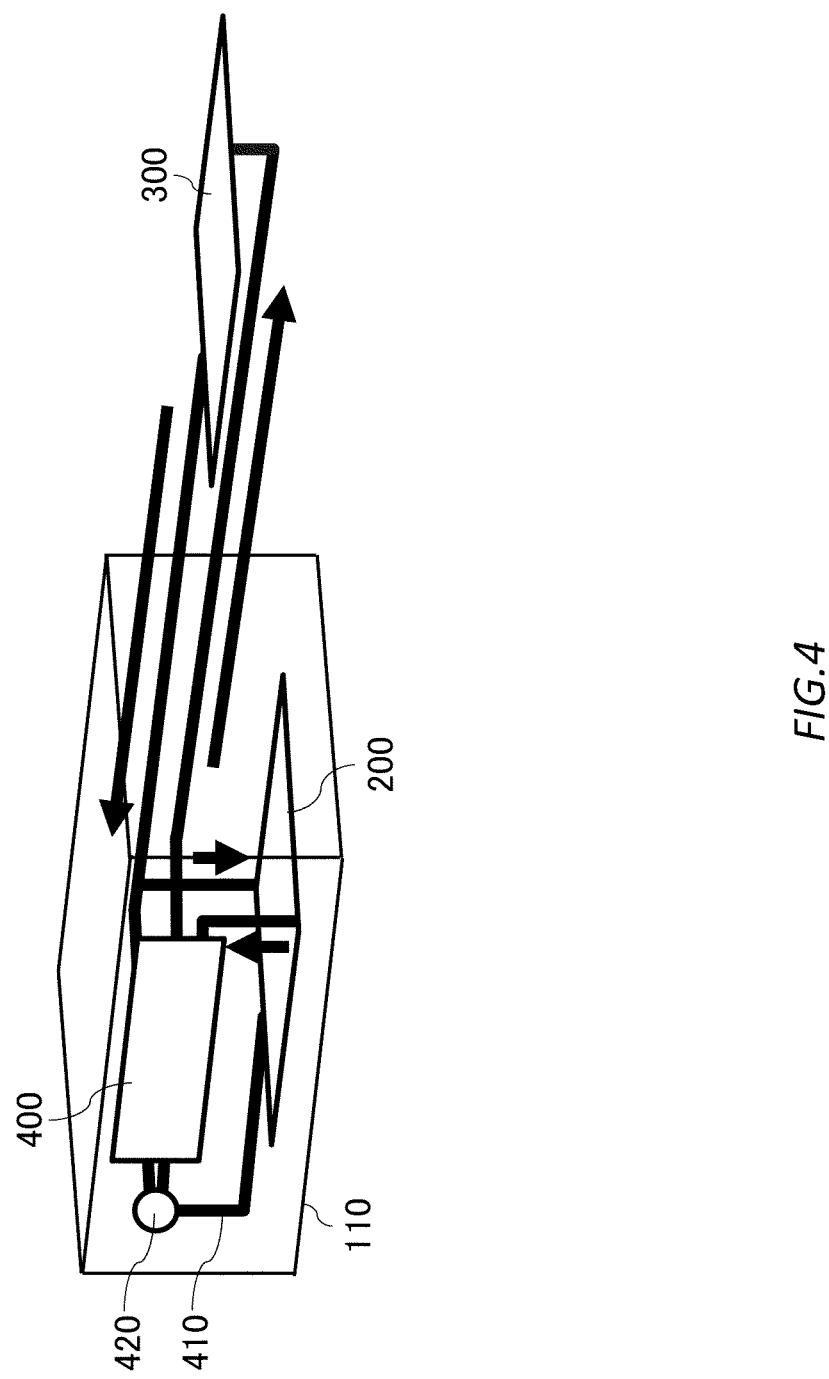
FIG. 4 schematically shows an example of a heat pipe 410 included in the HAPS 100.

FIG. 4 schematically shows an example of a heat pipe 410 included in the HAPS 100. The heat pipe 410 exchanges the heat between a payload 200, the battery 300, and a radiator 400. The radiator 400 is positioned to be higher than the payload 200, and the battery 300 is positioned to be higher than the radiator 400.

The heat pipe 410 has a check valve 420 that causes a hydraulic fluid to be circulated to transfer the heat of the battery 300 to the payload 200 and the radiator 400. As the hydraulic fluid, a CFC substitute, water, and the like may be adopted similar to a case of an existing heat pipe; however, a selection may be appropriately performed according to an environment in which the flight vehicle flies.

The radiator 400 may be arranged in the main body unit 110 as shown in FIG. 4. The radiator 400 may be arranged outside the main body unit 110.

The heat pipe 410 may be configured to heat and keep the payload 200 to be warm in a situation in which the payload 200 is at a low temperature, such as while the HAPS 100 is flying at night, while the HAPS 100 moves to a location where the wireless communication area 164 is deployed, or while the HAPS 100 is flying as a backup vehicle. The heat pipe 410 may be configured to cool the battery 300 and the payload 200 in a situation in which the power consumption is high, such as during daytime flight and prime time flight of the HAPS 100.

Figure 5:
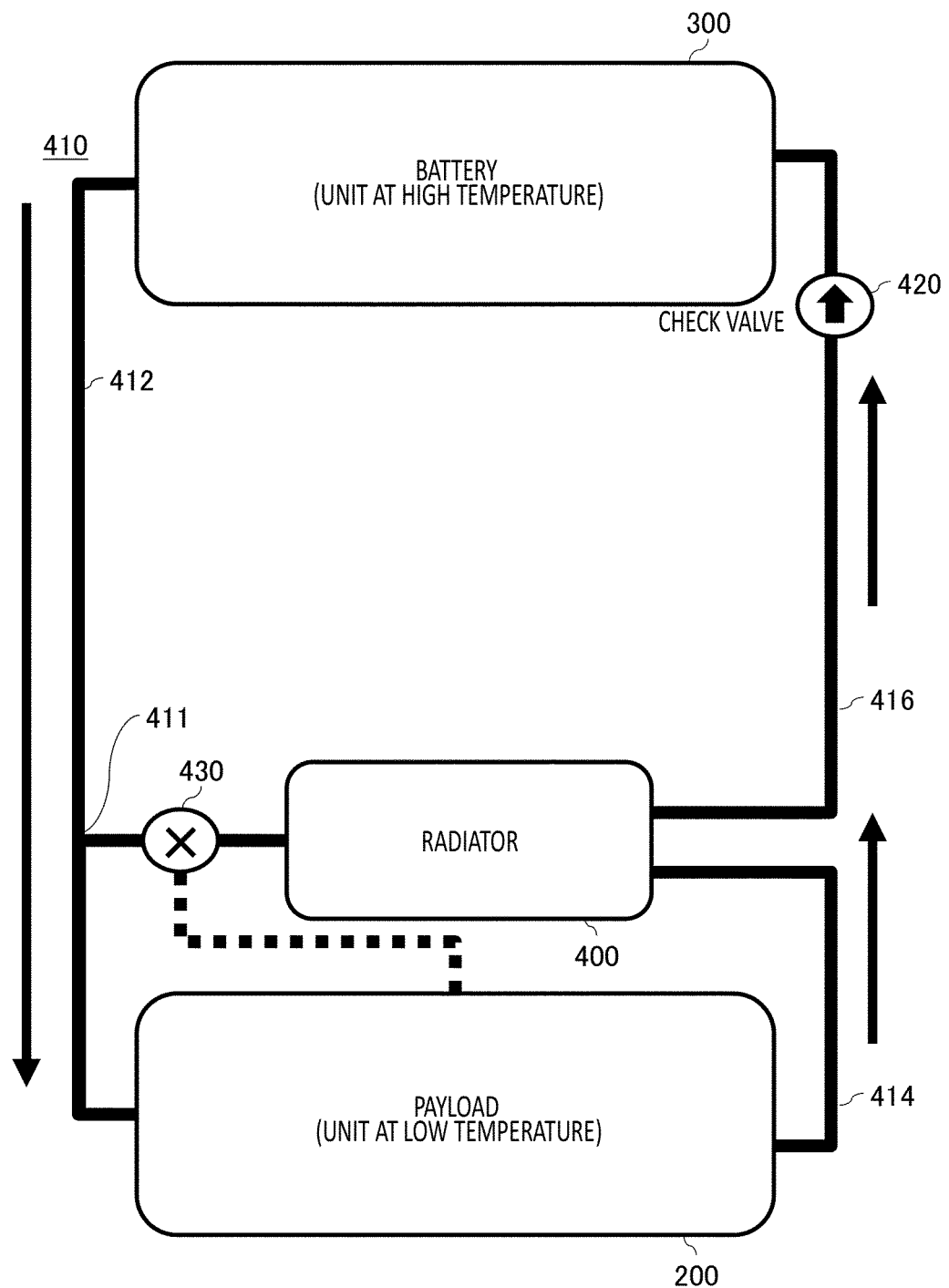
FIG. 5 is an illustration for describing heat circulation by the heat pipe 410.
Figure 6:
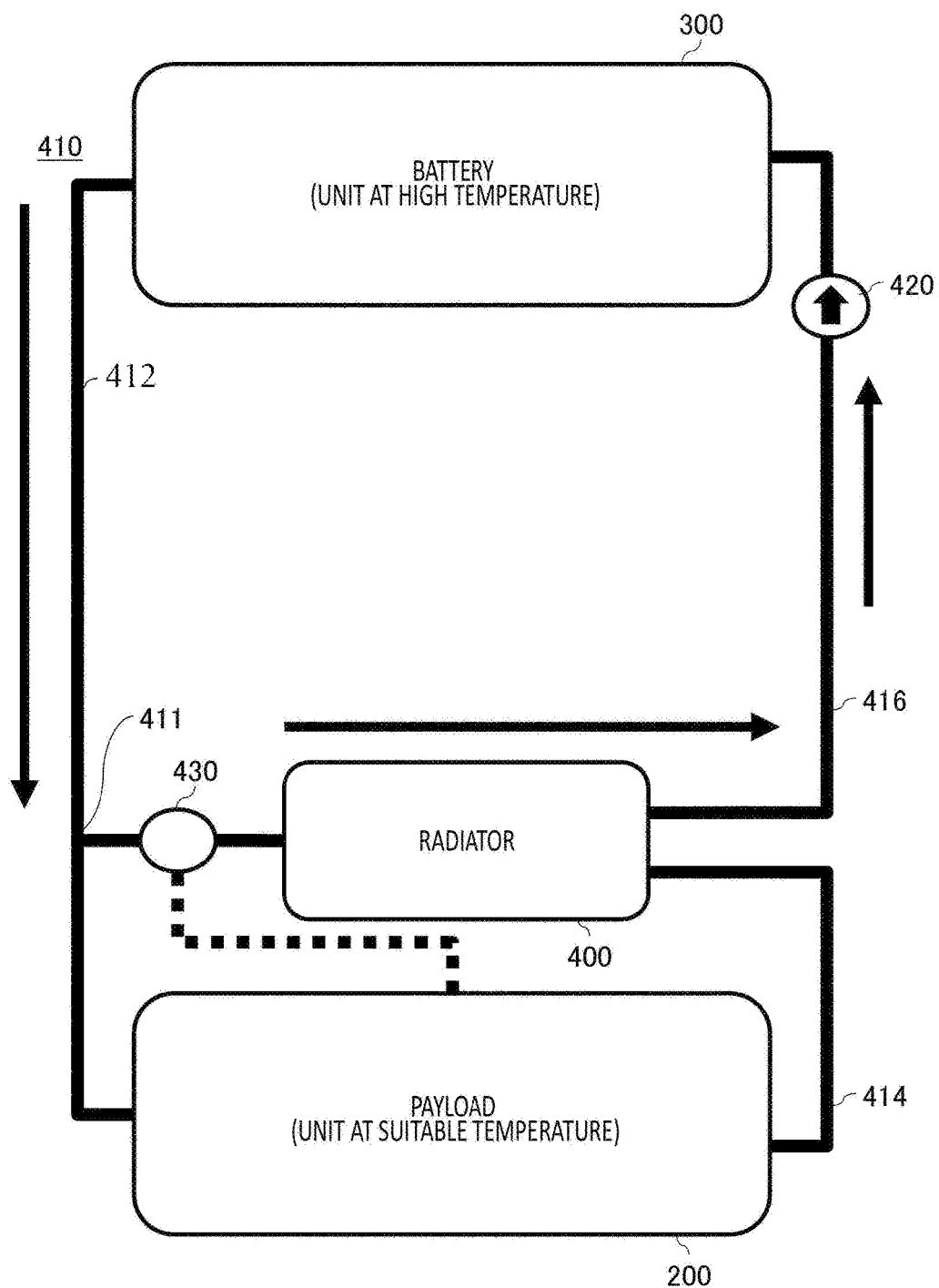
FIG. 6 is an illustration for describing the heat circulation by the heat pipe 410.
Figure 7:
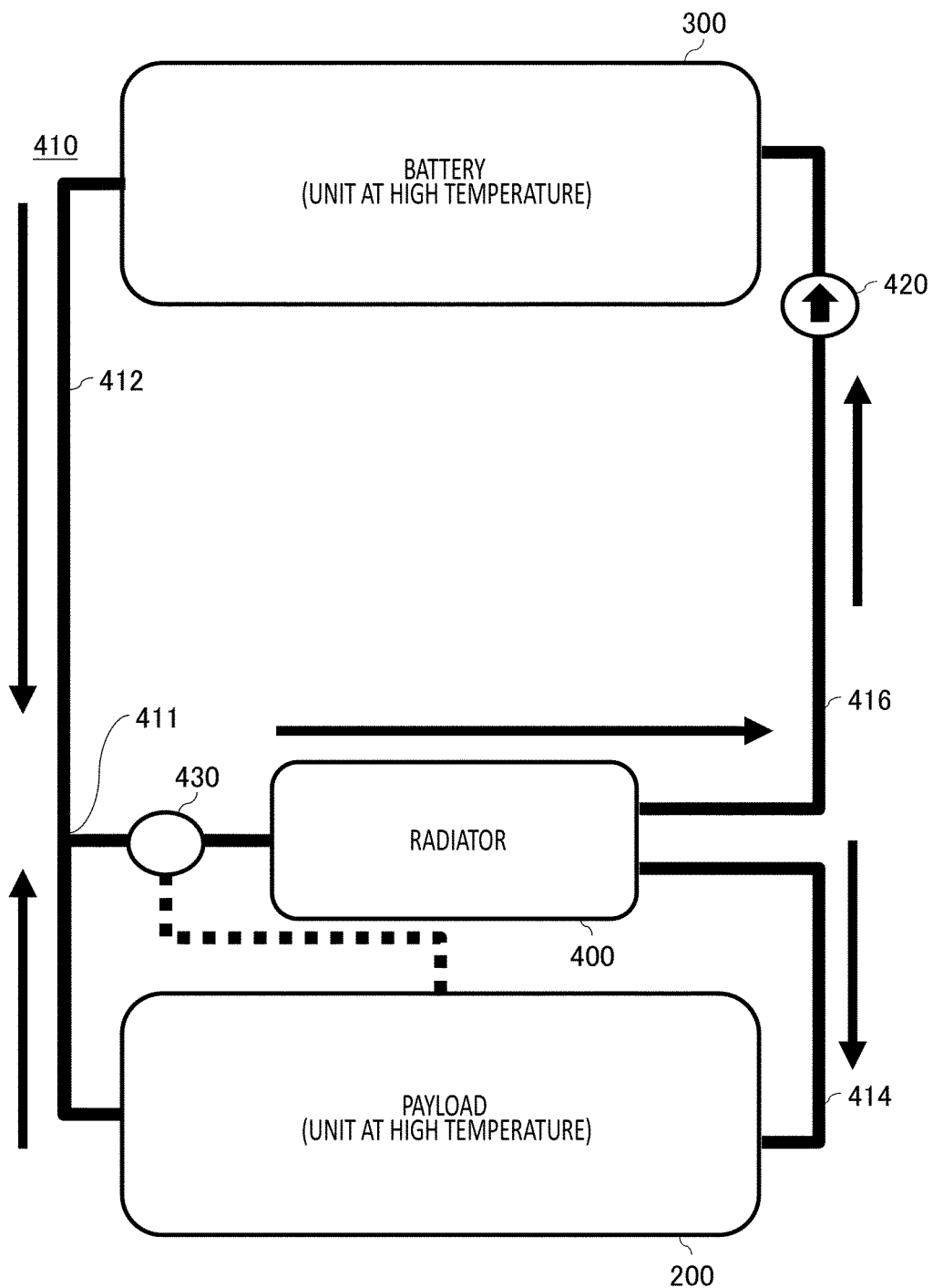
FIG. 7 is an illustration for describing the heat circulation by the heat pipe 410.

FIG. 5, FIG. 6, and FIG. 7 are illustrations for describing heat circulations by the heat pipe 410. FIG. 5 schematically shows how the hydraulic fluid circulates in a case where the payload 200 is at a low temperature. FIG. 6 schematically shows how the hydraulic fluid circulates in a case where the payload 200 is at a suitable temperature. FIG. 7 schematically shows how the hydraulic fluid circulates in a case where the payload 200 is at a high temperature.

The heat pipe 410 includes a battery corresponding portion that corresponds to the battery 300, a radiator corresponding portion that corresponds to the radiator 400, and a payload corresponding portion that corresponds to the payload 200. The battery corresponding portion may have a folded shape so as to contact more parts of the battery 300 to efficiently exchange the heat of the battery 300. The radiator corresponding portion may have a folded shape so as to contact more parts of the radiator 400 to efficiently dissipate the heat to the radiator 400. The payload corresponding portion may have a folded shape so as to contact more parts of the payload 200 to efficiently exchange the heat of the payload 200.

The heat pipe 410 may include a first circulation portion 412 that extends from the battery corresponding portion, branches at a branch unit 411, and is connected to each of the radiator corresponding portion and the payload corresponding portion; a second circulation portion 414 that extends from the payload corresponding portion and is connected to the radiator corresponding portion; and a third circulation portion 416 that extends from the radiator corresponding portion and is connected to the battery corresponding portion. The check valve 420 is positioned in the third circulation portion 416.

The heat pipe 410 has a valve 430 that is arranged between the branch unit 411 and the radiator corresponding portion in the first circulation portion 412 and that is closed when the temperature of the payload 200 is lower than a predetermined temperature threshold value, and is opened when the temperature of the payload 200 is higher than the temperature threshold value. The temperature threshold value may be, for example, 0° C. The temperature threshold value may be able to be set to any threshold value, or may be changeable. The valve 430 may be a thermostatic valve. It should be noted that the HAPS 100 may also include the valve 430 that is not the thermostatic valve; and a valve control unit that closes the valve 430 when the temperature of the payload 200 is lower than a predetermined temperature threshold value and that opens the valve 430 when the temperature of the payload 200 is higher than the temperature threshold value.

FIG. 5 illustrates a state in which the temperature of payload 200 is lower than a predetermined temperature threshold value and the valve 430 is closed. The temperature of the payload 200 may be, for example, approximately from −90° C. to 0° C. When there is no check valve 420, the hydraulic fluid which has become a gas, stays near the battery 300; however, the heat pipe 410 according to the present embodiment has the check valve 420, so that the hydraulic fluid circulates in order from the battery 300 to the payload 200, from the payload 200 to the radiator 400, and from the radiator 400 to the battery 300, and cools the battery 300 and the heat is exhausted by the payload 200.

FIG. 6 illustrates a case where the temperature of the payload 200 is a suitable temperature. The temperature threshold value is set to be lower than the suitable temperature, and when the temperature of payload 200 is the suitable temperature, the valve 430 is in an open state. The temperature threshold value may be, for example, 0° C., as described above, and the valve 430 is opened when the temperature of payload 200 exceeds 0° C. The suitable temperature for the payload 200 may be approximately from 0° C. to 50° C. When the temperature of the payload 200 is the suitable temperature, almost no hydraulic fluid circulates to a payload 200 side by a circulation resistance due to the structure of the payload corresponding portion of the heat pipe 410, and the hydraulic fluid circulates in order from the battery 300 to the radiator 400, and from the radiator 400 to the battery 300. In this manner, only the battery 300 is cooled and the heat is exhausted by the radiator 400.

FIG. 7 illustrates a case where the temperature of the payload 200 is a high temperature. The high temperature of the payload 200 may be, for example, 50° C. or higher. The valve 430 is in an open state. The temperature of the payload 200 is the high temperature, and thus the circulation of the hydraulic fluid occurs also on the payload 200 side. The hydraulic fluid circulates in order from the battery 300 to the radiator 400, and from the radiator 400 to the battery 300, and circulates in order from the payload 200 to the radiator 400 via the branch unit 411, and from the radiator 400 to the payload 200. In this manner, the payload 200 and the battery 300 are cooled, and the heat is exhausted by the radiator 400.

Figure 8:
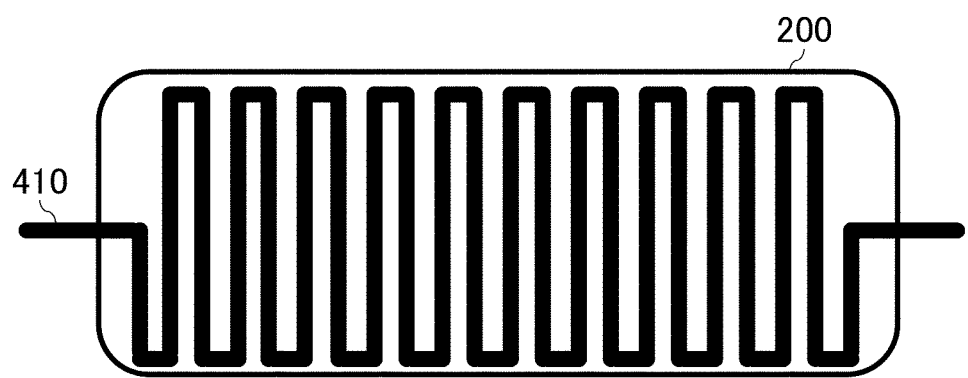
FIG. 8 schematically shows an example of a structure of a payload corresponding portion of the heat pipe 410.

FIG. 8 schematically shows an example of a structure of a payload corresponding portion of the heat pipe 410. The payload corresponding portion may have a folded structure, as illustrated in FIG. 8. By the payload corresponding portion having the folded structure, a portion that contacts the payload 200 increases, and it is possible to enhance the efficiency of the heat exchange. In addition, in comparison with the first circulation portion 412, the second circulation portion 414, and the third circulation portion 416, it is possible to increase the resistance through which the hydraulic fluid passes, and when the payload 200 reaches a suitable temperature, it is possible for the hydraulic fluid not to circulate to the payload corresponding portion. The battery corresponding portion of the heat pipe 410 may also have a structure similar to the structure shown in FIG. 8.

Figure 9:
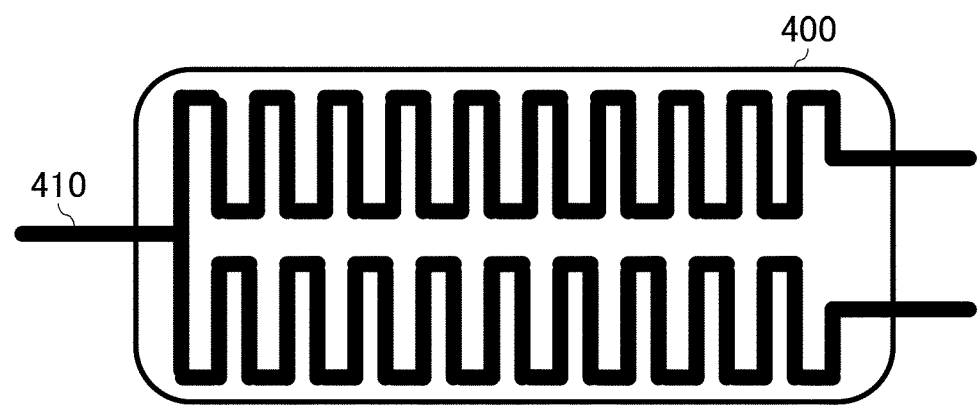
FIG. 9 schematically shows an example of a structure of a radiator corresponding portion of the heat pipe 410.

FIG. 9 schematically shows an example of a structure of a radiator corresponding portion of the heat pipe 410. As illustrated in FIG. 9, the radiator corresponding portion has a structure that branches at an inlet portion from the first circulation portion 412 and that is connected to each of the second circulation portion 414 and the third circulation portion 416, and may have a structure in which each connection portion is folded. By having such a structure, in a case where the payload 200 is at a high temperature, it is possible to cause the hydraulic fluid to circulate in order from the battery 300 to the radiator 400, and from the radiator 400 to the battery 300, and to circulate in order from the payload 200 to the radiator 400 via the branch unit 411, and from the radiator 400 to the payload 200. In addition, by having the folded structure, a portion that contacts the radiator 400 increases, and it is possible to enhance the efficiency of the heat exchange.

A temperature management control of the payload in the HAPS 100 in a stratospheric environment is an important and very difficult task. Electrical equipment, the control motor, and the like may not operate at a low temperature, and it requires electric power to be equipped with a heater for heating, which increases the weight. In addition, when a heat insulation structure is adopted, conversely, there occurs a problem that cooling becomes difficult. On the other hand, even when cooling is desired, a thin atmosphere makes it difficult for the heat to be naturally dissipated, and only a temperature of a unit at a high temperature becomes a very high temperature.

In the HAPS 100 according to the present embodiment, for example, the payload 200 that is desired to maintain a suitable temperature by being warmed and being cooled, and the battery 300 that is a portion at a high temperature and is desired to be cooled, are connected to each other by the heat pipe 410 having the check valve 420. Then, the radiator 400 and the valve 430 (the thermostatic valve) are arranged in between, and the valve 430 is opened and closed according to the temperature, and a flow mode of the hydraulic fluid in the valve 430 is changed to constantly cool the battery 300, and the warming and the cooling are performed to keep the payload 200 at the suitable temperature. This makes it possible to contribute to automatically maintaining the suitable temperature only by a force of the fluid without consuming the electric power, which enables an effective temperature management.

In the embodiment described above, the HAPS 100 is given as an example of the flight vehicle, but the present invention is not limited to this. The flight vehicle may be any flight vehicle as long as the battery and the payload are mounted on the flight vehicle.

While the embodiment of the present invention has been described, the technical scope of the invention is not limited to the above-described embodiment. It is apparent to persons skilled in the art that various alterations and improvements can be added to the above described embodiments. It is also apparent from the description of the claims that embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network, 30: user terminal, 40: gateway, 50: management apparatus, 100: HAPS, 110: main body unit, 120: wing unit, 122: main wing, 124: movable wing, 126: hinge, 132: air intake unit, 134: heat sink unit, 135: ventilation unit, 136: exhaust unit, 150: solar panel, 162: feeder link, 164: wireless communication area, 200: payload, 300: battery, 400: radiator, 410: heat pipe, 411: branch unit, 412: first circulation portion, 414: second circulation portion, 416: third circulation portion, 420: check valve, 430: valve.

What is claimed is:

1. A flight vehicle comprising:
a wing unit;
a battery that is arranged in the wing unit;
an air intake unit that is formed at a position corresponding to the battery on a front side of the wing unit;
a heat sink unit that is arranged for the battery and cools the battery by air which flows in from the air intake unit and that includes a ventilation unit having a shape widening from the front side toward a rear side; and
an exhaust unit that is formed at a position corresponding to the battery on the rear side of the wing unit and that exhausts air which flows out from the heat sink unit.

2. The flight vehicle according to claim 1, wherein the air intake unit, the heat sink unit, and the exhaust unit are connected, and the air intake unit takes in a laminar boundary layer on the front side of the wing unit by a negative pressure of a rear portion.

3. The flight vehicle according to claim 2, wherein the ventilation unit has a shape which increases in height from the front side toward the rear side.

4. The flight vehicle according to claim 2, wherein the heat sink unit has a harmonica shape.

5. The flight vehicle according to claim 2, wherein the exhaust unit has a shape which narrows from the front side toward the rear side.

6. The flight vehicle according to claim 2, wherein
the wing unit includes a main wing, and a movable wing connected to the main wing via a hinge unit, and
the exhaust unit has an exhaust port between the main wing and the hinge unit.

7. The flight vehicle according to claim 2, comprising:
a plurality of the batteries; and
a plurality of the air intake units, a plurality of the heat sink units, and a plurality of the exhaust units that respectively correspond to the plurality of batteries.

8. The flight vehicle according to claim 1, wherein the ventilation unit has a shape which increases in height from the front side toward the rear side.

9. The flight vehicle according to claim 8, wherein the heat sink unit has a harmonica shape.

10. The flight vehicle according to claim 8, wherein the exhaust unit has a shape which narrows from the front side toward the rear side.

11. The flight vehicle according to claim 8, wherein
the wing unit includes a main wing, and a movable wing connected to the main wing via a hinge unit, and
the exhaust unit has an exhaust port between the main wing and the hinge unit.

12. The flight vehicle according to claim 8, comprising:
a plurality of the batteries; and
a plurality of the air intake units, a plurality of the heat sink units, and a plurality of the exhaust units that respectively correspond to the plurality of batteries.

13. The flight vehicle according to claim 1, wherein the heat sink unit has a harmonica shape.

14. The flight vehicle according to claim 1, wherein the exhaust unit has a shape which narrows from the front side toward the rear side.

15. The flight vehicle according to claim 14, wherein the exhaust unit has a shape which decreases in height from the front side toward the rear side.

16. The flight vehicle according to claim 15, wherein the exhaust unit generates propulsion power for the flight vehicle by the exhaust and attracts the laminar boundary layer on the rear side of the wing unit.

17. The flight vehicle according to claim 14, wherein the exhaust unit generates propulsion power for the flight vehicle by the exhaust and attracts the laminar boundary layer on the rear side of the wing unit.

18. The flight vehicle according to claim 1, wherein
the wing unit includes a main wing, and a movable wing connected to the main wing via a hinge unit, and
the exhaust unit has an exhaust port between the main wing and the hinge unit.

19. The flight vehicle according to claim 1, comprising:
a plurality of the batteries; and
a plurality of the air intake units, a plurality of the heat sink units, and a plurality of the exhaust units that respectively correspond to the plurality of batteries.

20. The flight vehicle according to claim 1 that functions as a stratospheric platform.

* * * * *